United States Patent
Desenberg (10) Patent No.: US 7,139,732 B1
(45) Date of Patent: Nov. 21, 2006

(54) SYSTEMS, METHODS, AND COMPUTER PROGRAM PRODUCTS FACILITATING REAL-TIME TRANSACTIONS THROUGH THE PURCHASE OF LEAD OPTIONS

(76) Inventor: Roger Marx Desenberg, 564 Lees Trace, Marietta, GA (US) 30064

( * ) Notice: Subject to any disclaimer, the term of this patent is extended or adjusted under 35 U.S.C. 154(b) by 693 days.

(21) Appl. No.: 09/621,663

(22) Filed: Jul. 24, 2000

Related U.S. Application Data (60) Provisional application No. 60/144,984, filed on Jul. 22, 1999.

(51) Int. Cl.
*G06F 17/60* (2006.01)
(52) U.S. Cl. .......................... 705/37; 705/35
(58) Field of Classification Search .............. 705/7, 705/412, 35, 37
See application file for complete search history.

(56) References Cited

U.S. PATENT DOCUMENTS

| | | | |
|---|---|---|---|
| 6,047,274 A * | 4/2000 | Johnson | 705/412 |
| 6,078,892 A | 6/2000 | Anderson et al. | |
| 6,216,108 B1 * | 4/2001 | LeVander | 705/7 |
| 6,269,361 B1 | 7/2001 | Davis et al. | 707/3 |
| 6,513,710 B1 | 2/2003 | Haas | |
| 6,754,636 B1 * | 6/2004 | Walker et al. | 705/26 |

OTHER PUBLICATIONS

Business Wire; "eWork and ProSavvy Announce Merger and Financing: Merger and Financing Creates the Industry Leader in Work Related Services Procurement"; Jan. 25, 2005.*

* cited by examiner

*Primary Examiner*—Alain L. Bashore (57) ABSTRACT

Systems, methods and computer program products facilitating real-time service transactions between two or more users, including at least one client and at least one service provider. Service providers complete project profiles identifying projects they wish to work on, and clients complete project profiles identifying projects they would like to pay service providers to complete. The project profiles including identifying parameters such as the type of service or project, start date, completion date, skills required for completion, and the like. Both the clients and service providers may then purchase lead options to identify their desire for obtaining a matching user. The lead options can be a sum of money a user wishes to pay for a lead. The systems, methods and computer products then determine matching clients and service providers based upon the project profiles, and identifies to one or more lead option submitting users the immediately available users that match the project profile submitted by the user. In this manner, clients and service providers can utilize the present invention to locate immediately appropriate and available users with which to transact with.

18 Claims, 3 Drawing Sheets

SYSTEMS, METHODS, AND COMPUTER PROGRAM PRODUCTS FACILITATING REAL-TIME TRANSACTIONS THROUGH THE PURCHASE OF LEAD OPTIONS

CROSS-REFERENCE TO RELATED APPLICATIONS

The present application claims benefit from U.S. Provisional Application Ser. No. 60/144,984, filed Jul. 22, 1999, inventor Roger Desenberg, which is incorporated herein by reference.

FIELD OF THE INVENTION

The present invention relates generally to electronic transactions, and more specifically, to systems, methods, and computer program products for the facilitating real time project work transactions between service providers and clients.

BACKGROUND OF THE INVENTION

With the advent of the Internet, electronic commerce has become one of the fastest growing segments of the economy, due to the fact that the Internet is an easily accessible platform allowing individuals to transact with each other regardless of geographical boundaries or pre-existing relationships. As a result, this forum has lead to unparalleled opportunities for businesses and consumers. Currently, thousands of businesses and individuals offer virtually every type of product and service for purchase online, facilitating the exchange of over a billion dollars in goods each year. Moreover, as the Internet becomes more prolific in society, the number of transactions are expected to increase dramatically.

However, despite the Internet's success in facilitating commerce, hurdles still exist that prevent many businesses and consumers from successfully utilizing the Internet to facilitate business. One significant area this is readily apparent is in the sale and purchase of services, such as project work. For instance, due to the remote nature of Internet business transactions, services are difficult to market, especially as compared to goods, which are often uniform and can be more easily represented with present day technology. For instance, a consumer concerned about the quality of goods can purchase a well known brand name to reassure themselves that they are going to receive consistent quality even while purchasing site unseen, possibly from a vendor the consumer hasn't previously transacted with. Furthermore, consumers can often view goods online. On the contrary, services are difficult to market over the Internet using conventional websites because these services are not consistent, inventoried items, or items that are ready for exchange in a matter of a few days. Often, services take considerable amount of time to complete and require special skills. Furthermore, depending upon the work to be completed, a service must often be tailored to a customer, and the customer must know the service provider has the skill set to complete the service to the consumer's satisfaction. Conventional models based on the buying and selling goods do not offer a structured process to allow the buyer or seller to ensure all proper questions are asked and documented that will allow for a good transaction.

Currently, a significant amount of project work is marketed via advertising, including print ads, door to door advertising, mass mailings, and commercial advertising. Additionally, most project work is not facilitated by an electronic marketplace. Consumers who seek service providers to perform such work must often contact one company at a time, by telephone, mail, fax, or e-mail, in an attempt to determine what providers have the necessary skills, experience and capacity to complete a project. This process is often time consuming, as each company must obtain project specifications, and then make a bid for the project. Sometimes consumers are not offered any defined expectations as to when a bid will be completed, or as to the kind of bid expected. Moreover, there remains a great dependency on word of mouth contacts via friends and associates, which limits the buyers' and service providers' options and marketplace size. Finally, it is often very difficult to assess a service provider's or buyer's quality and reputation.

Furthermore, both customers and service providers typically incur significant expenses in locating each other. For service providers, these expenses are often in the form of advertising, and in the time and effort spent to convince consumers to purchase their services. Likewise, consumers incur expenses in the spending time to locate a suitable service provider. Additionally, where a need is immediate, clients can incur significant irreparable harm where they cannot locate a suitable service provider quickly.

Therefore, it will be appreciated that current Internet marketplace solutions are not readily scalable to facilitate a marketplace in which consumers and service providers can locate each other, and conventional methods of locating service providers and consumers is inefficient and often results in poorly informed choices. Therefore, what is needed are methods, systems and computer program products that enable consumers and service providers to locate each other in an efficient manner, with minimal delay, and with minimal cost. It would also be advantageous for these methods, systems and computer program products to facilitate project work transactions between clients and service providers. Furthermore, it would also be advantageous to allow service providers or customers to purchase lead options to express their desire to receive a match, which would otherwise take great time and expense.

SUMMARY OF THE INVENTION

The systems, methods and computer program products according to the present invention facilitate real-time service transactions between two or more users, including at least one client and at least one service provider. Service providers complete project profiles identifying projects they wish to work on, and clients complete project profiles identifying projects they would like to pay service providers to complete. The project profiles including identifying parameters such as the type of service or project, start date, completion date, skills required for completion, and the like. Both the clients and service providers may then purchase lead options to identify their desire for obtaining a matching user. The lead options can be a sum of money a user wishes to pay for a lead. The present invention then determines matching clients and service providers based upon the project profiles, and identifies to one or more lead option submitting users the immediately available users that match the project profile submitted by the user. In this manner, clients and service providers can utilize the present invention to locate immediately appropriate and available users with which to transact with.

According to one embodiment of the invention, there is disclosed a method for facilitating a real-time transaction between two or more users, wherein the two or more users comprise at least one client and at least one service provider. The method includes registering a first user profile, wherein registering the first user profile identifies a first user, and receiving first project profile information from the first user, wherein the first project profile information includes at least one attribute associated with a first project. The method also includes registering a second user profile, wherein registering the second user profile identifies a second user, and receiving second project profile information from the second user, wherein the second project profile information includes at least one attribute associated with a second project. The method further includes determining if the second user is available to transact with the first user, and, where the second user is available to transact with the first user, matching the first user and the second user based at least in part upon the first project profile information and the second project profile information. Finally, the method includes identifying the second user to the first user, where the first user provides, through the submission of lead option information, a preference for obtaining one or more matches.

According to one aspect of the invention, determining if the second user is available to transact with the first user includes determining if the second user is available to transact with the first user based upon the second project profile information. According to another aspect of the invention, the method further includes contacting the second user to determine if the user is immediately available to transact with the first user. Furthermore, the first user profile can include identification information, and the at least one attribute may be selected from one of the group consisting of a start date, an end date, and a maximum price. Additionally, the lead option information can include a sum of money, and can be received from the second user.

According to another embodiment of the invention, there is disclosed a system for matching users registered with a lead option engine, to facilitate a real-time transaction. The system includes a computer, a web browser resident upon the computer, wherein the web browser permits the user to access a network, and a lead option engine. The lead option engine is located on the network and accessible via the web browser, wherein the lead option engine matches users based upon project profile information, and offers at least one user the identity of at least one other matching user based at least in part upon lead option information, wherein the lead option information identifies the preference of the at least one user for identifying a matching user.

According to one aspect of the invention, the lead option engine offers at least one user the identity of at least one other matching user where the lead option engine has determined the at least one other matching user to be available for a transaction. Furthermore, the lead option information can include a maximum lead option value that is used by the lead option engine to determine the at least one user receiving the identity of the at least one other user. According to another aspect of the invention, the lead option engine is accessible by the web browser via the Internet, and can include a sum of money to be paid by a user for identifying a matching user. The project profile information can also include a plurality of attributes, received from each user, identifying a project to be completed, and the lead option engine can match users based upon similarities between the plurality of attributes received from each user.

According to yet another embodiment of the invention, there is disclosed an engine that facilitates transactions between users through the acceptance of lead options, wherein the users include clients and service providers. The engine includes a network interface enabling the engine to receive project profile information and lead options from a plurality of clients and from a plurality of service providers, a storage device that stores the project profile and lead options received from each client and each service provider, and a lead option application. The lead option application compares the project profile information received from each client to the project profile information received from each service provider, generates matching clients and service providers based upon the comparison of project profile information, and informs at least one user of a match based upon the lead options received from at least one of the clients or service providers.

According to one aspect of the invention, the project profile information includes an attribute selected from one of the group of attributes consisting of a project start date, a project end date, and a project maximum price. Additionally, the lead options can include a sum of money. Furthermore, the lead option application can rank the matching clients and service providers based upon the similarity of the project profile information received from each.

According to another embodiment of the invention, there is disclosed a computer program product for facilitating a real-time transaction between two or more users, wherein the two or more users comprise at least one client and at least one service provider, and wherein the computer program product comprises a computer readable storage medium having computer readable program code means embodied in said medium. The computer readable program code means includes computer instruction means for registering a first user profile, wherein registering the first user profile identifies a first user, receiving first project profile information from the first user, wherein the first project profile information includes at least one attribute associated with a first project, and registering a second user profile, wherein registering the second user profile identifies a second user. Additionally, the computer readable program code means includes computer instruction means for receiving second project profile information from the second user, wherein the second project profile information includes at least one attribute associated with a second project, and facilitating a transaction between the first user and the second user based at least in part upon the first project profile information, the second project profile information, and lead option information. The lead option information is received from the first user, and identifies a preference of the first user for identifying another user to transact with.

According to one aspect of the invention, determining if the second user is available to transact with the first user includes determining if the second user is available to transact with the first user based upon the second project profile information. According to another aspect of the invention, the method further includes contacting the second user to determine if the user is immediately available to transact with the first user. Furthermore, the first user profile can include identification information, and the at least one attribute may be selected from one of the group consisting of a start date, an end date, and a maximum price. Additionally, the lead option information can include a sum of money, and can be received from the second user.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

The present invention comprises systems, methods and computer program products that provide leads to clients and service providers (collectively referred to herein as users) based upon project profile information, which identifies compatible users, and lead information, which is used by the system to prioritize matches. Leads are referred to herein as the immediate or real-time identification of a user wishing to transact with a particular user, where one user is a client, the other user is a service providers, and wherein both have similar requirements concerning a type of project, a timeframe for completing the project, project specifications, user qualifications, and the like.

Thus, where a client desires a service provider to complete a project, the client can utilize the system of the present invention to locate such a provider. Likewise, where a service provider wishes to locate clients, the service provider can locate project work in their area of expertise. The lead information collected by the system of the present invention enables users to express their desirability for obtaining a match using lead options, which may be sums of money. Using lead options, the system of the present invention can prioritize matches such that matches are awarded to those offering the largest lead option, such as a sum of money, for a match.

This will be readily understood with reference to the following example, which is intended for illustrative purposes only, and is not implied to limit the type of transactions facilitated by the present invention. For instance, a carpenter having a specific skill set may utilize the system of the present invention to seek projects. In utilizing the system, the carpenter will be required to purchase lead options to express his desirability for obtaining a match. Because the invention, as will be described in detail below, can be implemented to provide a real-time marketplace for matching service providers and clients, it should be appreciated that there may be multiple other carpenters having similar skills and availability, who may simultaneously seek clients using the present invention. The system of the present invention can search for and locate clients seeking carpenters with specific skill availability and similar attributes identified by the clients. Where the system determines that one client matches multiple carpenters, based upon attributes input by the client and carpenters, the system will offer the match to the carpenter who has the highest value lead option. It will be appreciated that a similar illustrative scenario can occur where clients pay lead options for service providers. Thus, the invention disclosed herein provides for the efficient matching of clients and service providers to facilitate service transactions, where users can express their desire for a match using lead options.

Figure 1:
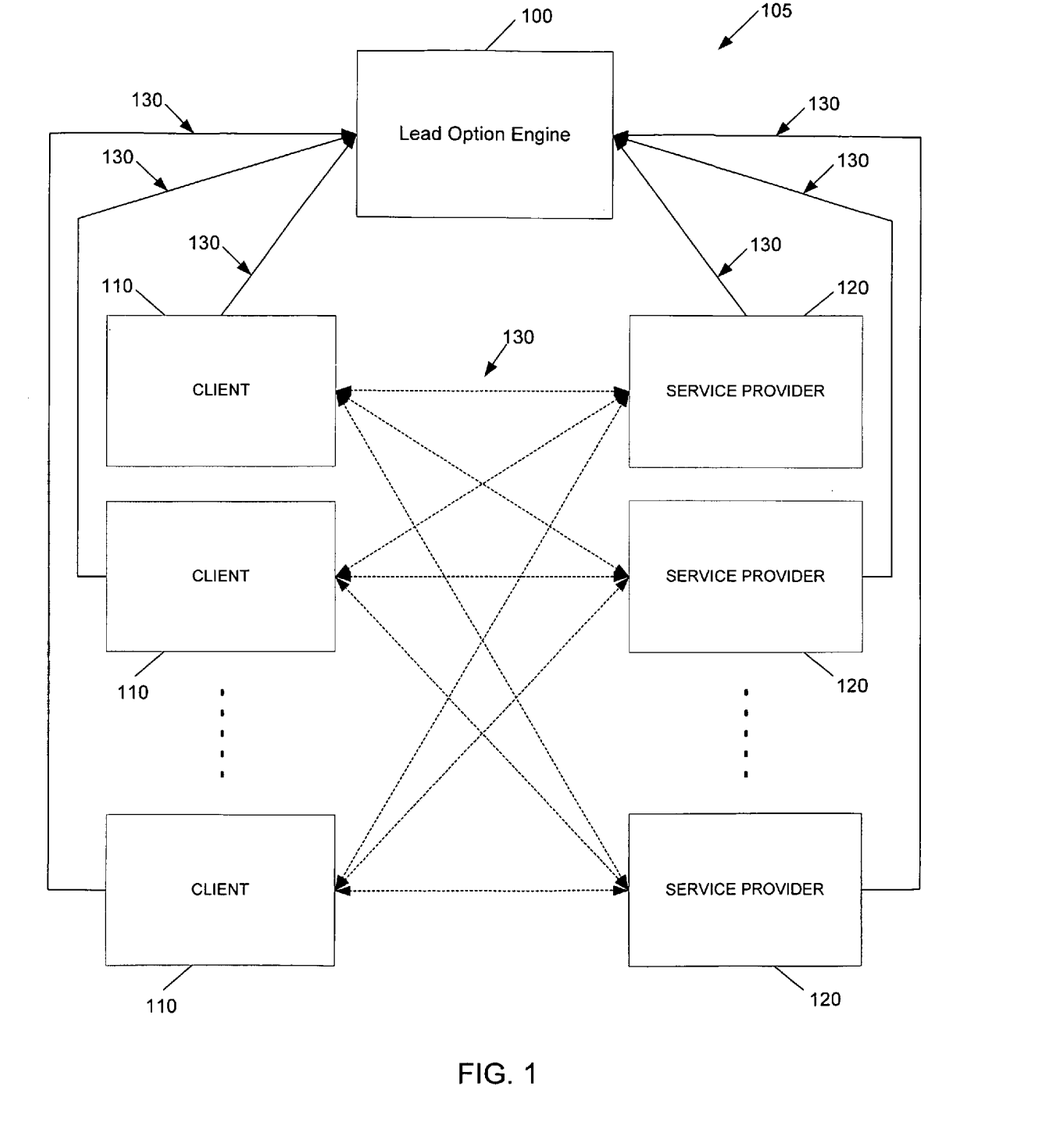
FIG. 1 shows a block diagram of a system of the present invention, according to one aspect of the present invention.

FIG. 1 shows a system 105 of the present invention, including a Lead Option Engine (LOE) 100 accessible by one or more clients 110 and one or more service providers 120 having access to the LOE 100 via communication links 130. The communication links 130 between the LOE 100, clients 110, and service providers 120 are preferably implemented through one or more communications networks, such as a private extranet, a public Internet, or a third party extranet, though it will be recognized by those skilled in the art that other networks such as a public switch telephone network (PSTN) may likewise be utilized. In a preferred embodiment, the communication links 130 are implemented via the Internet using Internet protocol (IP). Further, the clients 110 and service provides 120 are preferably implemented by desktop computers including a web browser application, optionally, with encryption capability. According to one aspect of the invention, the LOE 100 is accessible by the users through a web page located at an Internet destination, as is well known in the art. As will be described below, each client 110 and service provider 120 can optionally communicate with each other directly without the use of the LOE 100, as illustrated with dashed lines, once the LOE 100 provides the users with each others' contact information.

Figure 2:
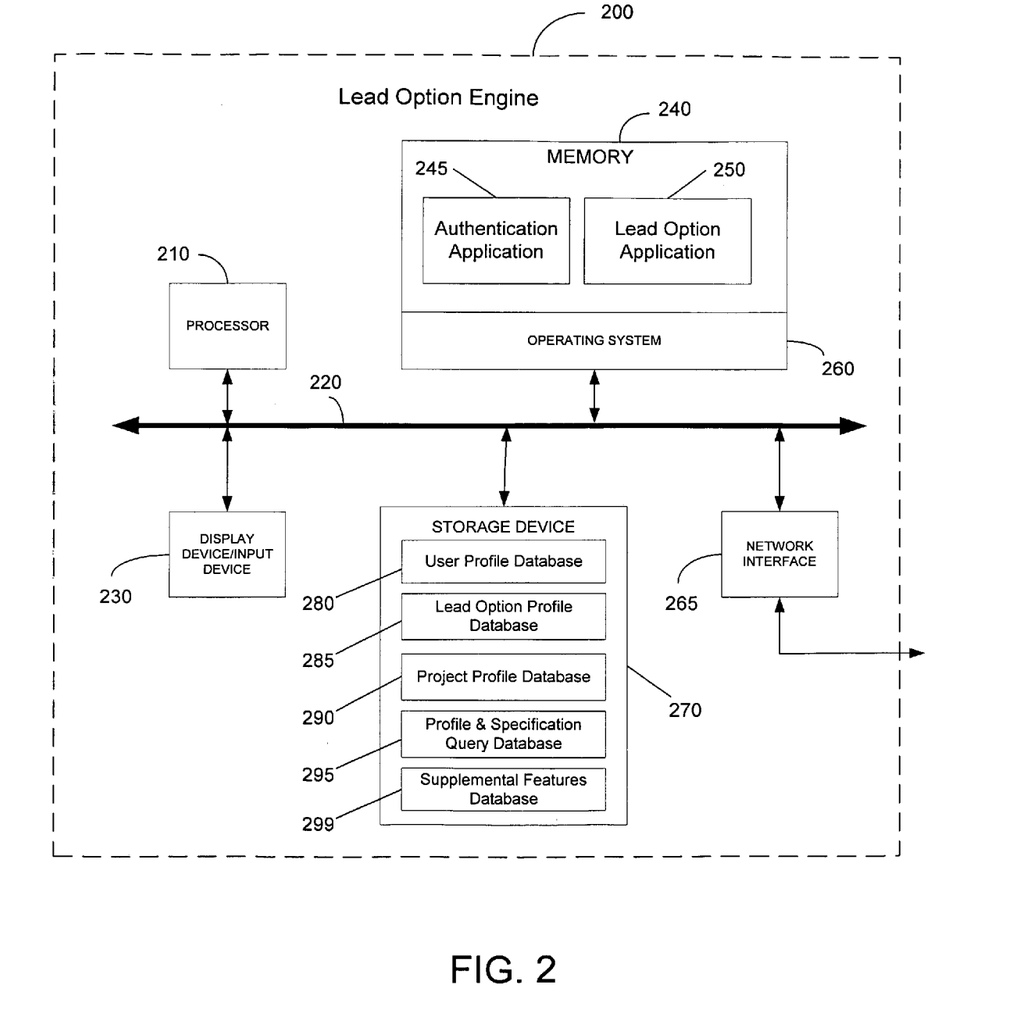
FIG. 2 shows a block diagram of a Lead Option Engine, according to one aspect of the present invention.

FIG. 2 shows an embodiment of the functional components of a LOE 200 in accordance with one aspect of the present invention. The LOE 200 includes a processor 210 that communicates with other elements within the LOE 200 via a system interface or bus 220. A display device/input device 230, for example, a keyboard or pointing device in combination with a monitor, is provided for receiving and outputting data to a user. It will be appreciated that a user can access and manipulate the LOE 200 directly via an input device 230 local to the LOE 200, or via an external network device, such as a computer in communication with the LOE 200 over a network connection. A memory 240 within the LOE 200 includes an Authentication Application 245 and a Lead Option Application (LOA) 250. The memory 250 further includes an operating system 260 that enables execution of the Authentication Application 245 and the LOA 250. A network interface 265 is provided for interfacing with other elements of an the system, as described in FIG. 1. Lastly, a storage device 270, such as a hard disk drive, contains files which are utilized by the Authentication Application 245 and LOA 250 to effect the methods described herein. In particular, the storage device 270 comprises a user profile database 280, a lead option profile database 285, a project profile database 290, a profile and specification query database 295, and a supplemental features database 299.

The function of each component within the illustrative LOE 200 will now be described in detail with reference to the flowchart of FIG. 3. However, it should be appreciated that each component within the LOE 200 may be combinable with any other components, including components within the LOE 200 or components located external to the LOE 200. Furthermore, some of the LOE 200 components discussed herein could be located entirely outside the LOE 200. Additionally, one or more of the functions performed by the components may be performed by a substitute component, or by an alternative component illustrated in FIG. 2. Therefore, the LOE 200 illustrated in FIG. 2 is not intended to represent the only possible structure of a LOE of the present invention, but one illustrative example of a LOE. Finally, it will be appreciated that the flow charts described below are illustrative embodiments of the invention, and are not intended to limit the scope of the invention described above.

Figure 3:
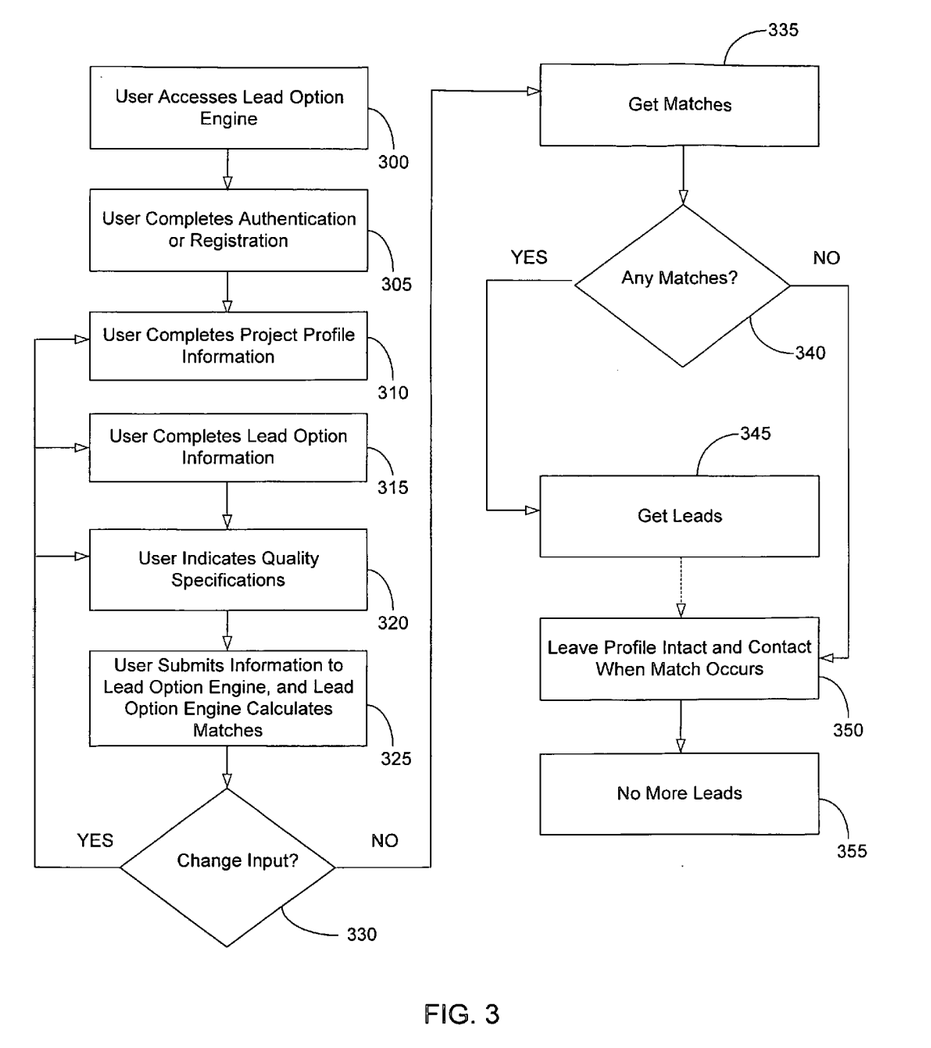
FIG. 3 shows a block diagram process flow implemented by a system of the present invention, according to one aspect of the invention.

FIG. 3 shows a general flow diagram illustrating the operation of a system of the present invention. Upon accessing the LOE 300, a registered user is first subjected to either an authentication or registration process 305, which is executed by the Authentication Application 245 in conjunction with the user profile database 280 and profile and specification query database 295. To Authenticate a user, the Authentication Application 245 can query the user for an ID and password. The ID and password are compared against IDs and passwords stored within the user profile database 280, using conventional techniques, to determine if the user has previously registered with the LOE 100. If a match is located, the LOE 100 identifies the user, and the user is authenticated and allowed to access the LOE 100 without further identification inputs. Alternatively, this could occur through the use of cookies stored on a user's computer, such that the authentication process is transparent to the user.

Where a user has not been previously registered, and thus does not have an ID or password, the Authentication Application 245 will query the user for registration information. The registration information can include identification information, such as name, address, E-mail address, and telephone number. The registration information may additionally include payment information, such as a credit card account number, an E-wallet account, or like billing information, which may be debited by the system when the user pays for lead options, which are explained in detail below. The queries presented to the user may be accessed by the authentication application 245 from the profile and specification query database 295, which stores queries or questions requiring a user response.

According to one aspect of the invention, queries relating to payment or account information may be presented to the user at a later time, such as just prior to matches being presented to the user (e.g., the user may be informed that matches exist, but that a payment must be made to view the matches). According to one aspect of the invention, users can pay per match, pay per session, pay for a subscription, or pay an amount that is equal to a percentage of the transaction amount (e.g., 1% of the total transaction). The registration can also include a step whereby a user who has provided any required identification and payment information can select an ID and password that is stored by the LOE 100 for use in identifying the registered user each subsequent time the user accesses the LOE 200. Finally, after a new user provides the necessary registration information, a user profile, which includes the user input registration information, is generated for the user and stored in the user profile database 280.

After completing the Authentication or Registration 305, the user is instructed by the LOA 250 to fill out project profile information 310. It will be appreciated that this instruction may be presented to the user on a different web page, or on a different screen than the registration information. The user may be forwarded to this screen by clicking on a link, or the user may be automatically forwarded to the screen after the LOE 200 determines that the user has completed the registration process. The Project Profile Information (PPI) collected from users enables the users to specify the type of service or project they would like completed, or would like to complete. Therefore, both service providers (those selling services) and clients (those buying services) are required to submit PPI. For a client, the PPI describes a specific project. For a vendor, this information describes an ideal type of project. The PPI is used by the LOE 200 to determine project matches, as will be explained in detail below.

To collect PPI from the user, the LOA 250 accesses project profile queries stored within the profile and specification query database 295, and presents these queries to the user. It should be appreciated hereinafter that the profile and specification database 295 can store and provide all queries submitted to users by the LOE 200. A user can respond to the queried using either preselected answers from a pulldown menu, multiple choice selection, or the like, or via user input PPI. According to one aspect of the invention, there are three major subject matter areas covered in the PPI queries, each of which contributes to the system's accurate assessment of user projects. These three areas, project parameters, project description, and organization personality, each contain multiple queries requiring user response.

The project parameter queries presented by the LOA 250 attempt to help characterize a particular project based upon a list of objective project attributes. For example, some of the project parameter queries include: the estimated hours to completion, estimated duration (the number of months/weeks to complete the hours), estimated overall cost of the project, highest cost or the project, ideal dollar amount for the project, dates available to the project, project start date, and a project end date. Thus, a client can indicate parameters that must be met by the potential pool of service providers in communication with the LOE 200. For instance, where a client inputs a start date that an otherwise skillful service provider cannot meet, this criteria can prevent the LOA 250 from matching that particular service provider and the client, as described in detail below.

In addition to project parameters, the user must respond to project description queries so that the system of the present invention can accurately determine the type of project a client or service provider wishes to purchase or sell. To accomplish this, the LOE 200 presents the users with questions regarding the type of industry in which the project is best classified, and general and specific skills required for the project. It is preferred that users respond to these questions through the use of pull down menus or lists of pre-determined keywords. However, users can also utilize user created keywords in order to facilitate project matching. To facilitate project matching and to assure the quality of PPI, the LOA 200 can suggest that the user use less keyword descriptors per profile. A user selecting a high number of keywords, such as more than a set amount specified by the LOA 250, can be asked to consider dividing the current profile into multiple profiles if the profile is in fact a description of several projects, and not one project. To supplement the information gathered from the keyword descriptors, users can enter any additional information, via a text box, relating to the project for inclusion in the PPI.

Finally, in compiling accurate PPI, the user has the option to fill out organization personality information to increase the effectiveness of the matching algorithm of the LOE 200, which is described in detail below. This objective information enables a user to identify those types of entities the user wishes to transact with. For example, a client may wish to work with only businesses having 20 or more years of experience, or a service provider may wish to work with only institutional clients, such as those having 50 or more employees. The organization personality queries, again stored within the profile and specification query database 295 and accessed by the LOA 250, can include questions concerning: Number of employees, Years in business, Processes used to perform project, Preferences of high speed, low cost, and high quality, Financial statements, Certifications, References, Communication medium preference, and Security requirements.

After a client responds to each of the above queries 310, the PPI corresponding to the user will be stored in the project profile database 290. However, it will be appreciated that answers to some queries may or may not be required to fully complete the PPI. For example, a client might enter only and end date for a project, and no start date where the start data is not a mandatory field, the LOE 200 will not request that the user complete this information. On the other hand, some fields, such as type of industry, might require a response from the user, or the LOE 200 will not allow the user to proceed. The project profile database 290 contains fields that store each, answer to the project profile queries generated by the profile and specification query database 295 in the form of attributes. It will be appreciated that the LOE 200 compares these attributes to other users attributes in determining whether a match will be generated. After PPI information has been completed, a user is required to complete lead option information 315, which identifies the preference of a user for obtaining one or more matches.

The submission of lead option information 315 allows a user to identify their preference for a match by placing a value on their desire for a match. According to one aspect of the invention, lead option information includes lead options, paid for by users, to obtain one or more matches. However, the LOE 200 will not require users to pay for leads. As such, the lead option information will preferably default to a null or zero value, which does not have to be altered by a user in response to a request by the LOE 200 to do so. However, the LOE 200 offers user the opportunity to specify a maximum dollar amount they are willing to pay for a lead. After matches are determined, as will be explained in detail below, the lead option information is utilized by the LOA 250 to determine the leads (matches) that will be presented to the users. More specifically, leads will be awarded to matching PPI in the following manner: first, by the highest dollar amount (i.e., maximum dollar amount for an option) that a user is willing to pay for a lead, and second, by first come first serve (FIFO) order. This results a fair and free marketplace.

The lead option information can also include the number of leads a clients wishes the LOE 200 to generate. This number can be set by the client, or by the LOE 200 based upon the type of project being requested. For instance, someone wishing to have their kitchen remodeled may be limited to 4 leads. On the other hand, an organization looking to build a large building may be limited to 15 leads. A service provider providing remodeling may be limited to 20 leads per week based on its size and ability to adequately provide documented bids to the leads in a reasonable time frame. Furthermore, in addition to the desired number of leads, a user may be asked by the LOE 200 to specify a date to start receiving leads and a date to stop receiving leads. By doing so, the user can set the lifetime of a lead option. Because the LOE 200 awards leads in real time, requiring start and stop dates enables users to create a lead options for later use.

The LOE 200 of the present invention may also request that the user indicate a period of time within which they will contact the lead. This information can also be included in the Lead Option Information. Where a user does not adhere to this timeframe, the LOE 200 can make a negative entry in a quality (or reputation) profile maintained on the user, which can be stored within the user profile database or in a similar database not illustrated in the LOE 200 of FIG. 2. This profile may be used by the LOA 250 in calculating matches. According to another aspect of the present invention, a user has the option to receive daily notification (via E-mail) of their place in line to receive leads. To perform this function, the LOE 200 can perform matching to determine the group of matching users, and list those users via the maximum price and date created. Viewing this report can assist the user in deciding whether to modify the lead option information.

Finally, the lead option information preferably includes information pertaining to user credits. According to one aspect of the present invention, users must set up an account within the LOE 200 by purchasing credits in blocks of a certain amount, for example $20.00. These credits are then used to pay for leads. The user may not be allowed to reserve lead option without having credits. For instance, if a user's lead option has a max price of $10, and they wish to receive 5 leads, they must have $50 of credits. The LOE 200 enables users to view the balance of their credits, purchase additional credits, and see the total possible amount of credits required for a specific number of leads. Thus, where user inputs a lead value of 5 dollars, and wishes to receive 7 leads, the LOA 250 will inform the user that 35 credits are required to receive these leads.

After the requisite lead option information is completed by the user 315, the information is stored in a lead option profile database 285. Alternatively, this information can be stored within the project profile database 290 or user profile database 280. This information can thereafter be accessed by the LOA 250 as necessary to determine leads offered to users. After the lead option information is completed, the LOA 250 queries the user for information concerning quality specifications 320. According to one aspect of the invention, this information is optional, and the user is not required to respond to these queries. Quality specification information allows a user to sort quality attributes in the order of their importance to the project. For instance, one of the classic choices that must be made when choosing a vendor to complete project work is prioritizing the following factors: high speed, low cost, and high quality. Therefore, the LOA 250 may present these to the user in list form such that the user can rank these quality specifications in order of their importance. Furthermore, the LOA 250 may utilize the user's project profile to specialize the quality specifications presented to the user. For instance, where a construction project is required, a client may be presented with selectable construction standards to indicate quality specifications. When any quality specification data entry 320 is complete, the information is stored within the project profile database 290 such that the specifications may be accessed or searched along with a related project profile, and the user has completed inputting the necessary data into the LOE 200. Therefore, after the quality specification information is completed, the user can request that the LOA 250 locate matches 325, which may be performed by the simple task of clicking on a submit button located on a page dedicated to the quality specification information.

The LOE 200 begins the matching of users by parsing the PPI stored within the project profile database 290 to extract attributes. Attributes obtained from a service provider PPI will be compared to the attributes obtained from client PPI, or vice versa, and a match percentage, as is well known in the art, is calculated based on this comparison. PPI are considered to be matched if their match percentage is equal to the minimum match percentage, which could be set by a user or a LOE 200 administrator to be some arbitrary value, such as 70%. Therefore, it will be appreciated that where the match percentage is set lower than 100%, not every piece of information input by two parties must be identical for the LOE 200 to determine a match has been made. However, where a user identifies that certain project profile information is required or mandatory, such as a client indicating that the client desires only service providers having 10 years of experience, the LOE 200 will not perceive a match, regardless of the match percentage, because the mandatory requirement is not met by the user.

More specifically, the LOA 250 matching process begins by a user being queried for a starting minimum match percentage, a step matching percentage increment, and the number of leads desired. This information may also be set by the LOE administrator, or may be automatically set based upon the type of project, or by another factor, such as the lead option value set by the user. The user will also set the hereafter, the LOA 250 calculates the number of matches based upon the minimum match percentage, as described above. After the number of matches are determined by the LOA 250, the LOA 250 determines if more matches are available than the number desired by the user. If there are fewer leads available than desired by the user, the leads will be distributed to users based upon the highest price a user is willing to pay for a lead, and the order will be established by first in first out (FIFO) and quality specification criteria.

On the other hand, where the number of leads exceeds the desired number of leads, the minimum match percentage is increased by one increment, and the LOA 250 recalculates the number of matches. Thereafter, the LOA 250 again compares the number of leads obtained to the number of leads desired to determine if there are fewer leads returned than requested, and additionally determines whether an performance tolerance level has been reached. The performance tolerance levels can include the minimum desired number of leads, or a price above which a user will obtain leads regardless of the match percentage. Where performance tolerance levels have been met, the minimum match percentage is returned to its previous setting and the leads will be distributed with the highest maximum price, and the order will be established by first in first out (FIFO) and quality. Where performance tolerance limits have not been met, the LOE 200 will determine if there are still more leads than the number of leads desired. If there are, the minimum match percentage will be increased by one increment again and recalculated. This loop will continue until the performance tolerance levels have been reached.

The function of the LOA 250 will best be understood with reference to the following three examples. In a first example, a user's minimum match percentage may be met such that there are a higher number of leads (20) than required by the user (5). As a result, the LOA 250 increases the minimum match percentage by an increment, such as by 5%. When the minimum match percentage increases by 5%, the number of leads may drop from 20 to 2. However, because the user requested 5 leads, the minimum match percentage will be dropped to 75% so that at least 5 matches will be returned. Thereafter, leads will be distributed based upon the highest maximum price, with the order established by first in first out (FIFO) and quality. Therefore, where 20 other users have submitted higher value lead options on the same matches, the LOA 250 will indicate that no leads have been located. At this time, the user can increment his lead options or wait until another match occurs in which he has a high enough value lead option to be included in a set of leads to a potential match.

According to another example, if there are many service providers with 90% or better matches with maximum lead prices of $45, and there is one service provider with a 70% match that is willing to pay $46, service provider's with 90% matches and better may receive the lead, because the LOA 250 may require a matching tolerance level. For instance, the 70% matching service provider would have to be willing to pay an amount equal to a matching tolerance level set, for instance, $10 more than the $45, to receive a lead. It will be appreciated that the LOA's matching criteria can therefore balance a service provider's need to obtain a lead with the quality of match of the service provider's project profile with that of the client.

According to third example, a first client has a maximum lead option price of $15, a second client has a maximum lead option price of $10, and a third client has a maximum lead option price of $5. Furthermore, each of the clients have requested only one lead, and each have submitted PPI that result in matches with the same service providers. As noted above, the LOA 250 will determine leads based upon the highest maximum price, where the order will be established by first in first out (FIFO) and quality. Therefore, the first lead is awarded to the first client, with the highest lead option value of $15, the second is awarded to the second client, with the second highest lead option value of $10, and the third lead is awarded to the third client, with a lead option value of $5. According to another aspect of the invention, the LOA 250 can determine the lowest amount paid for a lead, and can award subsequent leads to users based upon an increment above that lowest amount, where the users have otherwise have much higher valued lead options. This promotes use of the system, because people will not bid in fear that they are bidding too much, and because people will spend the least amount possible to receive a lead over another user. For instance, in the above example, where the lead increment is $1, set by the user or system administrator, the first client may receive a lead for the lead option price of $7, the second user may receive a lead for the price of $6, and the third, for $5.

Once the number of project matches has been determined, the number of matches and the corresponding percentage match rates are displayed to the user. Based on this report a user may choose to modify or change 330 his/her Project Profile Information 310, Lead Option Information 315, or Quality Specifications 320. If the user wishes to modify this information, the user is returned to the requisite page or location at which this information was previously collected, and the user may change any previous inputs 330. On the other hand, where the user is satisfied with the match percentage report, the user can request that the leads be retrieved 335. If there are leads 340, the LOA 250 will get the leads for the user 345. If there are no leads, the LOA 250 will indicate that no leads have been found.

Where no leads are located, a user has the option of modifying the Lead Option form in order to obtain more leads. A user also has the option of leaving the user and project profile information intact, and requesting that the LOE 200 contact the user at a later time if a lead is located. The LOE 200 can contact the user utilizing the user's contact information as stored within the user profile database 280. The user may be shown his position in the bidding relative to all of the bidders for comparable leads, and may also be provided an estimate of how long it will take to get another lead based on historical data. A user will therefore be best informed as how to increase the maximum cost per lead. If the maximum cost per lead is changed, a new total maximum cost can be calculated by the LOA 250 and displayed. The user may also be presented with input boxes for changing the values of: maximum cost per lead, maximum number of leads, date to start receiving leads, and date to stop receiving leads. If the user changes the data in any of the four fields, he may be required to submit the information, such as via an update button, to see the effect of the change on the estimated time it will take to get another lead. If the user wished to exit the LOE 200, the user's lead option information and the project profile may be stored within the lead option profile database 285 and project profile database 290 for future matching.

When the LOE 200 has identified all of the available leads to a user, the user are asked to negotiate with the client/service provider as soon as possible and keep the LOE 200 informed of the results. If possible, the client and service provider can negotiate online immediately via Chat Room or Video Conferencing or a telephone call. These facilities are made available so that the users can reach agreement quickly, see Facilitating Communication below.

According to one aspect of the invention, the LOE 200 offers supplemental features to facilitate transactions when a user wishes to pursue a transaction with a match made by the LOE. These features include automated E-mail, Quality and Reputation Tracking, Contract Assistance, Money Transferring Assistance, and Escrow capability.

The LOE can automatically E-mail a user when a match is made. In order to appreciate the benefit of this feature, the following example, in which a client has received three leads and has exited the LOE, will be considered. In this example, the LOE may immediately send the client an E-mail that confirms the three leads they received, and the three service providers (leads) will also be sent immediate E-mails informing them that their contact information was provided to a client and that they should hear from the client shortly. At the same time, E-mails can be scheduled for a set time period, such as two days, after execution of the leads. These E-mails are sent to both the client and the service providers asking questions about the responsiveness and good faith of all of the parties involved. All of the recipients are also asked whether they have concluded negotiations and reached agreement with the lead/s because of using the LOE.

If no agreement has been reached, they will receive another E-mail asking whether the negotiations failed and will not succeed. If they failed, the record is closed. If they are still negotiating, another E-mail is scheduled for five days (a parameter that can be set by the user or LOE administrator) later which asks for a status from all of the parties. Answers to the status E-mail will be processed and stored but no further action will be taken. If any of the leads resulted in successful negotiations between a client and a service provider, the client and service provider will be sent E-mails asking a set of quality related questions. Their answers will be processed and stored for use in the quality and reputation tracking process.

The client might not close a deal with all of the leads. Service providers that are not included in a deal using the LOE contract assistance option are still valuable prospective leads for other clients. The LOE will analyze the results to determine if they should receive a "Sorry" E-mail and quality related questions about the process. If the user only wishes to conduct business with one lead, the "Sorry" E-mails will be sent. But sometimes the user may wish to conduct business with more than one lead. Checks will be made to determine if they have already been sent a set of questions about the process. If the first set of scheduled Emails have not been sent they will be deleted. Any service provider that is still on the "active list" will be sent an Email asking their opinions about the quality of the process and the client.

Quality/Reputation Tracking is another supplemental feature that may be offered by the systems, methods and computer program products of the present invention. Quality measurement and tracking is achieved through asking respondents a set of questions about a performer. This is accomplished using the Automated Email process described above. The questions may be about responsiveness, good faith negotiation and other attributes that affect the quality and value of the leads produced by the Lead Option Engine. Several factors can be considered when a score is produced, such as the Respondent, The Performer, The Quality Type, The Questions Asked, The Answers Received, The Raw Score, The Weighting Factor, as well as other data, such as adherence to the terms and conditions of the LOE. The resulting quality can be included in clients and service providers profiles that will be available to future users wishing to conduct business with the clients and service providers. Should a user be given poor quality scores by users of good reputations, the customer service department, may at its discretion contact the user and suspend their use of the LOE system for a defined period of time.

According to yet another aspect of the invention, the LOE can facilitate communications among multiple users where the users are currently accessible online. For instance, after viewing lead contact information, the LOE can establish if any of the user's leads are currently online, and ask the user if they would like to communicate with any of the leads currently online. Three methods of instant communication, private chat rooms, videoconference, and telephone calls, are supported by the LOE. The LOE provides private chat rooms for its users to meet one another to discuss relevant items pertaining to the current project and to negotiate an agreement (contract). The LOE can assure the security of these chat rooms. When a user requests a private chat room they will become the administrator of that room and will have the ability to grant or deny access to other LOE users. This service will use standard Chat Room software that is in use on the Internet. It will be made available through the LOE web servers. An alternative to the chat room is the videoconference. The LOE will provide users with back end capability to meet in cyberspace using videoconference technology. This option is available to users who have the required hardware and software. This service will use standard videoconference software that is in use on the Internet.

Yet another supplemental feature of the LOE is the ability to provide contract assistance to clients and service providers by providing online collections of industry specific contract samples that users can copy to facilitate making their deals. Secure storage capability for the final contracts that the clients and service providers have finalized. Secure retrieval capability of the contracts that have been stored in case of a dispute later.

Additionally, the LOE provides a facility online for the transfer of funds between the client, the service provider and the LOE. This optional service will include transfer of finds via several methods including: Credit Cards, Debit Cards, Checks, Check by Phone, Wire Transfers, Internet money. Money will be able to be transferred once or according to a schedule. Furthermore, clients and service providers may wish to have a third party company hold money in escrow during the length of their contract. Clients and service providers will be able to contact various third parties immediately on-line, or via other communications means.

According to one alternative embodiment of the present invention, the systems, methods and computer program products disclosed herein can be implemented as a brokering engine deployed for use by a multitude of LOE marketplaces, such as those on the world wide web. Because many sites use and implement marketplaces, a marketplace would be helpful where overflow and market-to-market transactions can occur. The LOE of the present invention can supply the solution. For instance, if a construction LOE marketplace has too many clients seeking to have a service provider redo their kitchens, and there aren't enough service providers in the marketplace to take the work, the marketplace can utilize a global LOE to transact with other LOE marketplaces, thereby finding service providers to take up overflow work. This would likewise work where there is an overabundance of service providers rather than clients. This global LOE is advantageous because marketplaces normally competing for the business of their users, and thus, don't typically create systems to communicate. The LOE of the present invention may enable instant communications among the various marketplaces to ensure as many transactions are processed as possible. This global marketplace, or members only marketplace, will therefore allow client marketplaces to search other client marketplaces for qualified transactions for their users. Transaction fees, and other associated monetary transactions can automatically be managed by the members only marketplace according to a set of parameters. For example, according to one aspect of the invention, commissions and transaction fees can be automatically split among various marketplaces.

Thus, the systems, methods and computer program products of the present invention offer a number of advantages. For instance, because the LOE provides leads on only those service providers and customers who are prepared to transact, and who meet each other's criteria (e.g., project completion date), a service deal using the present invention can be closed in a matter of minutes. Furthermore, the present invention offers a fair marketplace by allowing any entity to compete for service providers or clients. Accordingly, the LOE provides a marketplace that creates a long term solution where participants can quickly and comfortably transact business and return for repeat use. This is clearly differentiated from other matching engines, which may result in thousands of matches, and do not offer checks on availability or qualifications. An LOE according to the present invention also provides for quality, speed and cost preferences, as well as organizational requirements. Therefore, the LOE provides only matches that are desired, and none that are not desired based on the project profile and organization profile. Finally, the present invention provides natural incentives for service providers to respond quickly to potential clients because money is invested in each lead, others may have potentially received the same lead, and the service providers may be evaluated.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for a user using a communication network to search for and identify at least one matching provider of project work, the method comprising;
   transmission of a lead comprising contact information that enables communication between the user and the provider, wherein the transaction lead price is the amount of money paid for the lead, and further wherein a service is performed by the user or the provider as a result of the tranmission of the lead and wherein the performance of the service includes a service transaction fee paid by the user or the provider;
   storing in a database at least first provider information and second provider information, the at least first provider information and the at least second provider representing at least respective maximum lead prices, each of the respective maximum lead prices representing the maximum amount that each of at least a first provider and a second provider is willing to pay for an lead, wherein each of the at least first and second providers provide at least one service with which the lead is associated;

comparing the respective maximum lead prices to determine a lowest respective maximum lead price;

identifying the provider associated with the lowest one of the respective maximum lead prices;

receiving at least one lead limit that represents a maximum quantity of leads to be provided;

receiving from a user or provider a request for contact information, the contact information enabling communication between the user and at least one of the first provider and the second provider;

selecting at least one provider based on each respective provider's maximum lead price and the lead limit;

calculating a respective transaction lead price for each of the at least one selected provider, wherein the respective transaction lead price equals at most each respective selected provider's maximum lead price; and providing the at least one lead to the user or provider for project work.

2. The method of claim 1, wherein the lead comprises at least one of a hyperlink to a provider's Internet web site, a provider's e-mail address, a provider's name, a provider's code, or a provider's telephone number.

3. The method of claim 1, wherein the lead comprises at least one of a hyperlink to the user's Internet web site, the user's e-mail address, the user's name, the user's code, or the user's telephone number.

4. The method of claim 1, wherein the lead comprises information enabling communication between a provider and the user.

5. The method of claim 1, wherein the at least first provider information and second provider information further represent a respective last lead date, and wherein the step of selecting is further based on each respective last lead date.

6. The method of claim 1, wherein the at least first provider information and second provider information further represent a respective description of a feature of the at least one service provided by the at least first provider and the second provider.

7. The method of claim 6, wherein the request further comprises a respective description of at least one feature of a service sought by the user.

8. The method of claim 7, further comprising:

comparing the respective description in the request with the description in the at least first provider information and second provider information; and defining a set of providers based on the step of comparing the description in the request with the description in the at least first provider information and second provider information.

9. The method of claim 7, further comprising matching at least one of the at least first provider information and second provider information with the respective description in the request based on the degree in which each feature described in the at least first provider information and second provider information correspond to the described feature in the request.

10. The method of claim 9, further comprising providing a number of leads based on at least one of the step of matching and the lead limit.

11. The method of claim 10, further adjusting the quantity of the at least one lead based upon a comparison of the step of matching and the respective maximum lead price.

12. The method of claim 1, further comprising charging at least one of the first provider and the second provider an amount corresponding to the at least one of the first provider's and the second provider's respective transaction lead price.

13. The method of claim 12, wherein the step of selecting is further based on a respective amount of credit each of at least the first provider and the second provider have.

14. The method of claim 1, wherein the step of selecting is further based on at least one of the date and time the at least first provider information and second provider information is received, in case at least two of the at least first provider and second provider have the same respective maximum lead price.

15. The method of claim 1, wherein at least one of the first provider information and the second provider information is received in the form of a respective provider profile.

16. The method of claim 1, wherein the request received from the user is formatted as an user profile.

17. The method of claim 1, wherein at least one of the at least first provider and second provider is an organization.

18. The method of claim 1, further comprising:

providing a respective transaction lead price increment value for calculating a respective transaction lead price for at least one of the first provider and the second provider;

ranking at least one provider based on each respective provider's maximum lead price, wherein the step of calculating a respective transaction lead price for each of the providers further comprises using at least one of the lowest maximum lead price, the lead increment value, the ranking of the at least one provider, and the respective transaction lead price of the provider in the next lowest ranking.

* * * * *